(12) United States Patent
Murochi et al.

(10) Patent No.: US 8,421,406 B2
(45) Date of Patent: Apr. 16, 2013

(54) CHARGE CONTROL CIRCUIT, BATTERY-OPERATED DEVICE, CHARGING APPARATUS AND CHARGING METHOD

(75) Inventors: Harumi Murochi, Aichi (JP); Yasuyuki Yoshihara, Aichi (JP); Tomoya Kikuchi, Aichi (JP); Kazuyuki Shimada, Aichi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/576,317

(22) PCT Filed: Nov. 7, 2011

(86) PCT No.: PCT/JP2011/006201
§ 371 (c)(1),
(2), (4) Date: Jul. 31, 2012

(87) PCT Pub. No.: WO2012/070190
PCT Pub. Date: May 31, 2012

(65) Prior Publication Data
US 2012/0293114 A1 Nov. 22, 2012

(30) Foreign Application Priority Data
Nov. 25, 2010 (JP) .................................. 2010-261964

(51) Int. Cl.
*H02J 7/00* (2006.01)
(52) U.S. Cl.
USPC ..... 320/107; 180/65.1; 180/65.21; 180/65.31
(58) Field of Classification Search .................... 320/107
See application file for complete search history.

(56) References Cited

U.S. PATENT DOCUMENTS

| 4,583,034 | A | * | 4/1986 | Martin | 320/134 |
| 5,818,115 | A | * | 10/1998 | Nagao | 290/31 |
| 5,969,624 | A | * | 10/1999 | Sakai et al. | 340/636.1 |
| 6,275,006 | B1 | * | 8/2001 | Koike et al. | 320/125 |

(Continued)

FOREIGN PATENT DOCUMENTS

| CN | 102017358 A | | 4/2011 |
| JP | 2000-243457 | * | 8/2000 |
| JP | 2000-243457 A | | 9/2000 |

(Continued)

OTHER PUBLICATIONS

International Search Report issued in International Patent Application No. PCT/JP2011/006201 dated Feb. 7, 2012.

*Primary Examiner* — Yalkew Fantu
(74) *Attorney, Agent, or Firm* — McDermott Will & Emery LLP

(57) ABSTRACT

A charge control circuit includes a first acquisition unit that acquires a total discharge electric quantity of a lead storage battery, the total discharge electric quantity being separated into a first discharge electric quantity which is a discharge electric quantity of a discharge current having a current value of less than a predetermined level, and a second discharge electric quantity which is a discharge electric quantity of a discharge current having a current value of not less than the predetermined level, a computing unit that obtains a first and second charge electric quantities corresponding to the first and second discharge electric quantities respectively, and a charge electric quantity required for charging the lead storage battery as a sum of the obtained first and second charge electric quantities, and a charge control unit that controls a charge of the lead storage battery based on the charge electric quantity.

12 Claims, 8 Drawing Sheets

U.S. PATENT DOCUMENTS

| | | | |
|---|---|---|---|
| 6,624,529 B2 * | 9/2003 | Obayashi | 290/40 C |
| 2002/0113441 A1 * | 8/2002 | Obayashi | 290/40 C |
| 2008/0084179 A1 * | 4/2008 | Emori et al. | 320/109 |
| 2009/0020346 A1 * | 1/2009 | Krauer et al. | 180/65.2 |
| 2011/0057619 A1 | 3/2011 | Kikuchi et al. | |

FOREIGN PATENT DOCUMENTS

| | | |
|---|---|---|
| JP | 2003-219571 A | 7/2003 |
| JP | 4473944 B2 | 6/2010 |
| WO | WO-2010/016275 A1 | 2/2010 |

* cited by examiner

FIG. 5

| DISCHARGE PATTERN | DRIVE PERIOD | | | PAUSE (DARK CURRENT DISCHARGE) PERIOD | | | | | | |
|---|---|---|---|---|---|---|---|---|---|---|
| | X1~X4 | | D2 | Y1~Y3 | | Y4 | | D1 | D1/D |
| | MINUTES | C | | MINUTES | C | MINUTES | C | | |
| L | 21.4 | 1/3 | 28.53 | 30 | 0.01 | 57 | 0.01 | 1.47 | 0.05 |
| M | 18 | 1/3 | 24.00 | 60 | 0.01 | 420 | 0.01 | 6.00 | 0.20 |
| N | 13.5 | 1/3 | 18.00 | 120 | 0.01 | 840 | 0.01 | 12.00 | 0.40 |

CHARGE CONTROL CIRCUIT, BATTERY-OPERATED DEVICE, CHARGING APPARATUS AND CHARGING METHOD

RELATED APPLICATIONS

This application is the U.S. National Phase under 35 U.S.C. §371 of International Application No. PCT/JP2011/006201, filed on Nov. 7, 2011, which in turn claims the benefit of Japanese Application No. 2010-261964, filed on Nov. 25, 2010, the disclosures of which Applications are incorporated by reference herein.

TECHNICAL FIELD

The present invention relates to a charge control circuit, a battery-operated device, a charging apparatus and a charging method, and in particular relates to a charge control circuit, a battery-operated device, a charging apparatus and a charging method suitable for a lead storage battery which is used as a power source of an equipment in which a dark current discharge is performed.

BACKGROUND ART

In recent years, lead storage batteries are once again in the spotlight as smart power, based on the improvement of the charge and discharge properties thereof, in the industrial field where expensive lithium ion secondary batteries make no business sense. The foregoing industrial field is not the field where lead storage batteries are used in portable devices, and refers to the field of special electric vehicles such as electric carts and forklifts in which the recycling of the lead storage batteries themselves or the devices containing such lead storage batteries is satisfactory.

The electric vehicles described above need to efficiently charge the lead storage batteries by leveraging the short down time (for example, while the passengers are playing golf in the case of electric carts used in golf courses, and while the operator is having a meal or a drink in the case of forklifts used for carrying cargo) of the user (driver). Thus, considered may be utilizing the technology (for example, Patent Document 1) of increasing the SOC (State Of Charge) based on a multi-stage constant current charge of three stages or more (charging current when the number of charging stages is n stages will be I1>I2> . . . >In−1) of decreasing the charging current upon reaching a predetermined voltage V1 and proceeding to the charging of the subsequent stage, and performing the final-stage charging for a predetermined time after the lead storage battery reaches the voltage V1. It is considered that the method of using this technology and performing a quick charge with a relatively large current in the initial stage of the multi-stage constant current charge during the short down time, and obtaining a full charge through all stages of the multi-stage constant current charge after the completion of operation.

However, in cases of using a lead storage battery as the main power source of a special electric vehicle that is basically not equipped with an auxiliary power source and repeating the charge and discharge process, unlike a vehicle equipped with an auxiliary power source, it is now known that the charging method giving consideration to a quick charge as with Patent Document 1 will result in insufficient charging, and there are cases where the life property of the lead storage battery will deteriorate.

Patent Document 1: Japanese Patent Application Publication No. 2000-243457

SUMMARY OF THE INVENTION

The present invention was devised to resolve the foregoing problems, and an object of this invention is to provide a charge control circuit, a battery-operated device, a charging apparatus and a charging method capable of suitably charging a lead storage battery without lowering the life property.

A charge control circuit according to one aspect of the present invention is a charge control circuit that controls a charging unit which charges a lead storage battery used as a power source of a battery-operated device, comprises: a first acquisition unit that acquires, according to an instruction of charge start, a total discharge electric quantity of the lead storage battery during a period from an end time of a previous charge to a start time of a present charge, the total discharge electric quantity being separated into a first discharge electric quantity which is a discharge electric quantity of a discharge current having a current value of less than a predetermined level, and a second discharge electric quantity which is a discharge electric quantity of a discharge current having a current value of not less than the predetermined level; a computing unit that obtains a first charge electric quantity corresponding to the first discharge electric quantity acquired by the first acquisition unit, a second charge electric quantity corresponding to the second discharge electric quantity acquired by the first acquisition unit, and a charge electric quantity required for charging the lead storage battery as a sum of the obtained first charge electric quantity and second charge electric quantity; and a charge control unit that controls a charge of the lead storage battery by the charging unit based on the charge electric quantity obtained by the computing unit.

A battery-operated device according to another aspect of the present invention comprises: the foregoing charge control circuit; the lead storage battery to be used as the power source; a first load to which a current, of which a current value is less than the predetermined level, is supplied from the lead storage battery; and a second load to which a current, of which a current value is not less than the predetermined level, is supplied from the lead storage battery.

A charging apparatus according to yet another aspect of the present invention comprises: the foregoing charge control circuit; and a charging unit that is controlled by the charge control circuit and charges the lead storage battery.

A charging method according to yet another aspect of the present invention is a method of charging a lead storage battery used as a power source of a battery-operated device, comprises: a first step of acquiring, according to an instruction of charge start, a total discharge electric quantity of the lead storage battery during a period from an end time of a previous charge to a start time of a present charge, the total discharge electric quantity being separated into a first discharge electric quantity which is a discharge electric quantity of a discharge current having a current value of less than a predetermined level, and a second discharge electric quantity which is a discharge electric quantity of a discharge current having a current value of not less than the predetermined level; a second step of obtaining a first charge electric quantity corresponding to the first discharge electric quantity acquired in the first step, a second charge electric quantity corresponding to the second discharge electric quantity acquired in the first step, and a charge electric quantity required for charging the lead storage battery as a sum of the obtained first charge electric quantity and second charge electric quantity; and a third step of controlling a charge of the lead storage battery based on the charge electric quantity obtained in the second step.

BRIEF DESCRIPTION OF THE DRAWINGS

FIG. 5 is a diagram showing, in a tabular form, the discharge pattern performed in the examples and the comparative examples.

Figure 1:
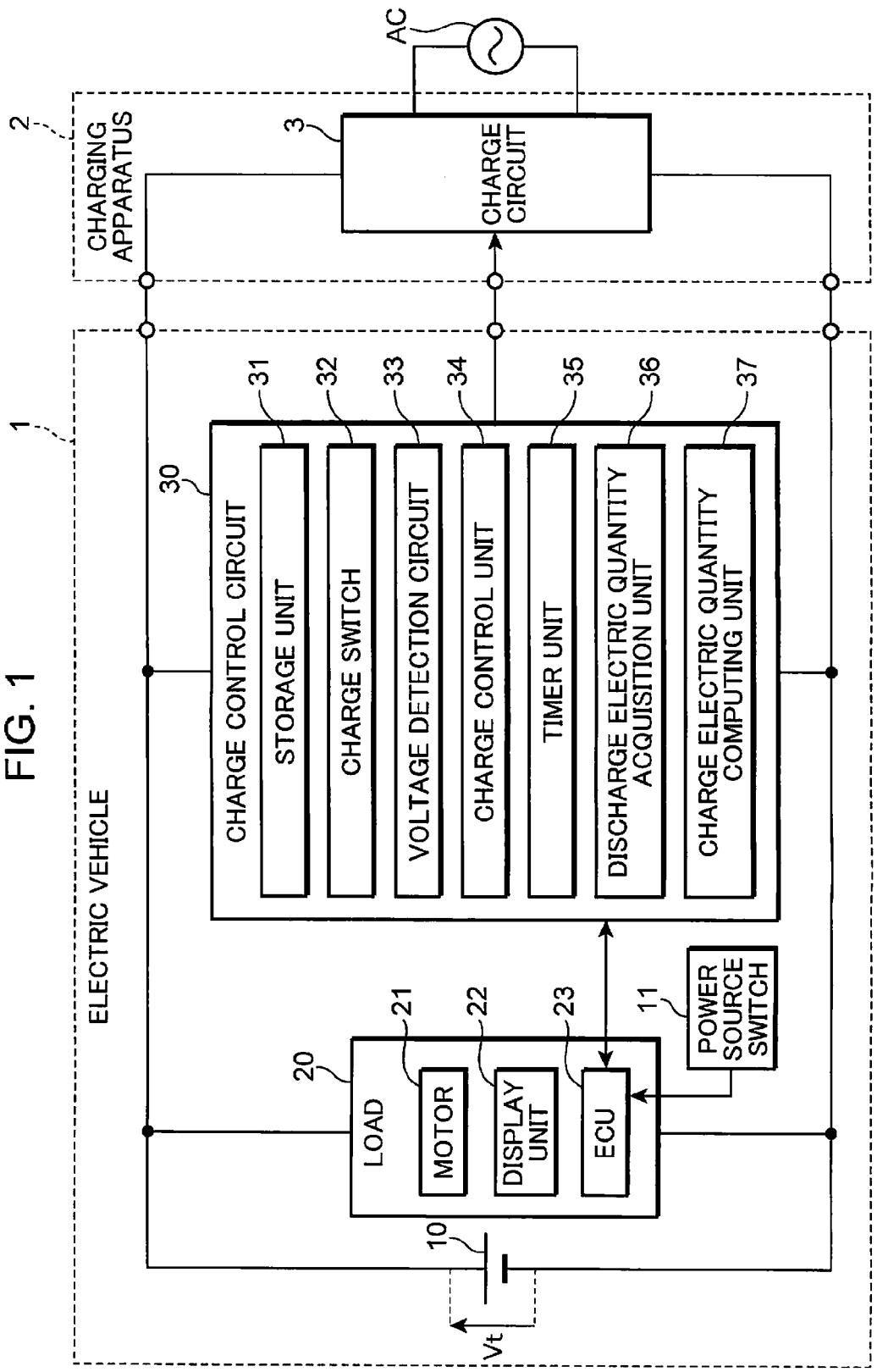
FIG. 1 is a block diagram showing a state where an electric vehicle according to an embodiment of the present invention is connected to a charging apparatus.

DESCRIPTION OF EMBODIMENTS (Principle of Present Invention)

The principle of the present invention is foremost described. The present inventors discovered that it is difficult to fully charge a lead storage battery with the charging methods, which were conventionally considered to be favorable, when the ratio of the discharge electric quantity (discharge electric quantity of a so-called dark current) during a time other than when a special electric vehicle is being driven relative to the overall discharge electric quantity is large. This logic is speculated as follows.

Lead sulfate, which is a discharge product of a lead storage battery, tends to return to a charge product (lead dioxide at positive electrode, metal lead at negative electrode) due to the subsequent charging when the crystals of such lead sulfate are small. However, when the lead sulfate crystals grow and become large as a result of being unattended for a long period of time, it becomes difficult for the lead sulfate to return to the charge product in comparison to cases when the crystals are small.

In addition, when discharge is performed with a dark current, which is a current of a small level that is incomparable to the case of driving a motor or the like, lead sulfate of large crystals is easily generated as with the case where the lead sulfate crystals are left unattended for a long period of time. Note that the discharge electric quantity of the dark current becomes accumulated when a special electric vehicle is left unattended, such as during its down time during the weekend, which may occur under normal circumstances.

If the discharge electric quantity of the large current associated with the drive of the motor or the like from a full charge is sufficiently large as with conventional technology, the discharge electric quantity of the dark current is relatively small (ratio of lead sulfate of large crystals is small). Accordingly, lead sulfate of large crystals that is generated due to a dark current discharge can return to a charge product based on the subsequent full charge, despite the inefficiency.

However, when the discharge electric quantity of the dark current becomes relatively large as a result of the discharge electric quantity of the large current from a full charge is small, the ratio of lead sulfate of large crystals will increase. Here, if the discharge electric quantity of the dark current (proportionate to the electric quantity that was consumed for generating lead sulfate of large crystals) is treated as a part of the total discharge electric quantity without differentiation from the normal discharge electric quantity, most of the lead sulfate of large crystals cannot be returned to the charge product only with the calculated charge electric quantity. Thus, insufficient charging occurs, and this leads to the deterioration in the life property of the lead storage battery.

The present inventors who speculated the foregoing logic discovered that the total discharge electric quantity of the lead storage battery should not be treated collectively, and needs to be obtained as a sum of the discharge electric quantity $D1$ of the dark current and the discharge electric quantity $D2$ of a current other than the dark current. In addition, the present inventors discovered that most of the lead sulfate of large crystals can be returned to the charge product by separately obtaining and adding the charge electric quantity corresponding to the discharge electric quantity $D1$ of the dark current and the discharge electric quantity $D2$ of a current other than the dark current to obtain a charge electric quantity $C$, and charging the lead storage battery based on the obtained charge electric quantity $C$.

Conventionally, as with a system capable of sequentially recharging the amount of dark current discharge based on an uninterruptible power supply or an automotive cell starter or an auxiliary power source with sufficient charge electric quantity, the main usage environment was efficiently returning lead sulfate of large crystals to the charge product. In other words, in a usage environment where the auxiliary power source or the like is used for supplying the dark current and the lead storage battery is used only for supplying a large current to a motor or the like, lead sulfate of large crystals was hardly generated. Thus, the discovery of the current problem associated with the increase in the ratio of the discharge electric quantity of the dark current was in itself difficult. Note that the dark current will be described later.

(Embodiments)

The preferred embodiments of the present invention are now described with reference to the drawings.

FIG. 1 is a block diagram showing a state where the electric vehicle according to an embodiment of the present invention is connected to the charging apparatus. An electric vehicle 1 shown in FIG. 1 comprises a lead storage battery 10, a power source switch 11, a load 20, and a charge control circuit 30 according to an embodiment of the present invention. The lead storage battery 10 supplies power to the respective parts of the electric vehicle 1. The power source switch 11 turns ON/OFF the power source of the electric vehicle 1. The power source switch 11, for instance, turns ON the power source of the electric vehicle 1 when an operator inserts a key, and turns OFF the power source when the key is pulled out. The load 20 includes a motor 21, a display unit 22, and an electronic control unit (ECU) 23. The motor 21 functions as a drive source for moving the vehicle. The display unit 22 is configured, for example, from a liquid crystal display panel, and displays operation information to be notified to the operator.

The ECU 23 comprises, for example, a CPU (Central Processing Unit) which executes predetermined arithmetic processing, a ROM (Read Only Memory) which stores predetermined control programs, a RAM (Random Access Memory) which temporarily stores data, and a peripheral circuit of the foregoing components and the like. The ECU 23 controls the overall operation of the electric vehicle 1. The ECU 23 clocks the elapsed time of the OFF state of the power source switch 11 (that is, the OFF time of the electric vehicle 1) from an end time of a previous charge. The ECU 23 notifies the charge control circuit 30 of the clocked down time of the electric vehicle 1 when requested by the charge control circuit 30. Note that the electric vehicle 1 shown in FIG. 1 only comprises the lead storage battery 10 as the power source, and does not comprise any other auxiliary power source or the like.

The charge control circuit 30 is configured the same as the ECU 23. In other words, the charge control circuit 30 comprises, for example, a CPU which executes predetermined arithmetic processing, a ROM which stores predetermined control programs, a RAM which temporarily stores data, and a peripheral circuit of the foregoing components and the like. The charge control circuit 30 additionally comprises a storage unit 31 configured from a flash memory or the like, a charge switch 32, and a voltage detection circuit 33. The charge control circuit 30 functions as a charge control unit 34, a timer unit 35, a discharge electric quantity acquisition unit 36, and a charge electric quantity computing unit 37 by executing the control programs stored in the ROM.

The charging apparatus 2 comprises a charge circuit 3 connected to a commercial power source AC, for example. The charge circuit 3 comprises, for example, an AC-DC converter, a DC-DC converter and the like. The charge circuit 3 supplies a charging current according to the request from the charge control circuit 30 to the lead storage battery 10, and thereby charges the lead storage battery 10. When the operator of the electric vehicle 1 connects the electric vehicle 1 to the charging apparatus 2 and turns ON the charge switch 32, the charge control circuit 30 causes the charge circuit 3 to start operating, and the lead storage battery 10 of the electric vehicle 1 is charged with the charging current supplied from the charge circuit 3. The charge control circuit 30 controls the charge circuit 3 and, in this embodiment for instance, charges the lead storage battery 10 with a multi-stage (n-stage) constant current charge method. Here, n is an integer of 2 or more, and in this embodiment n=2.

Figure 2:
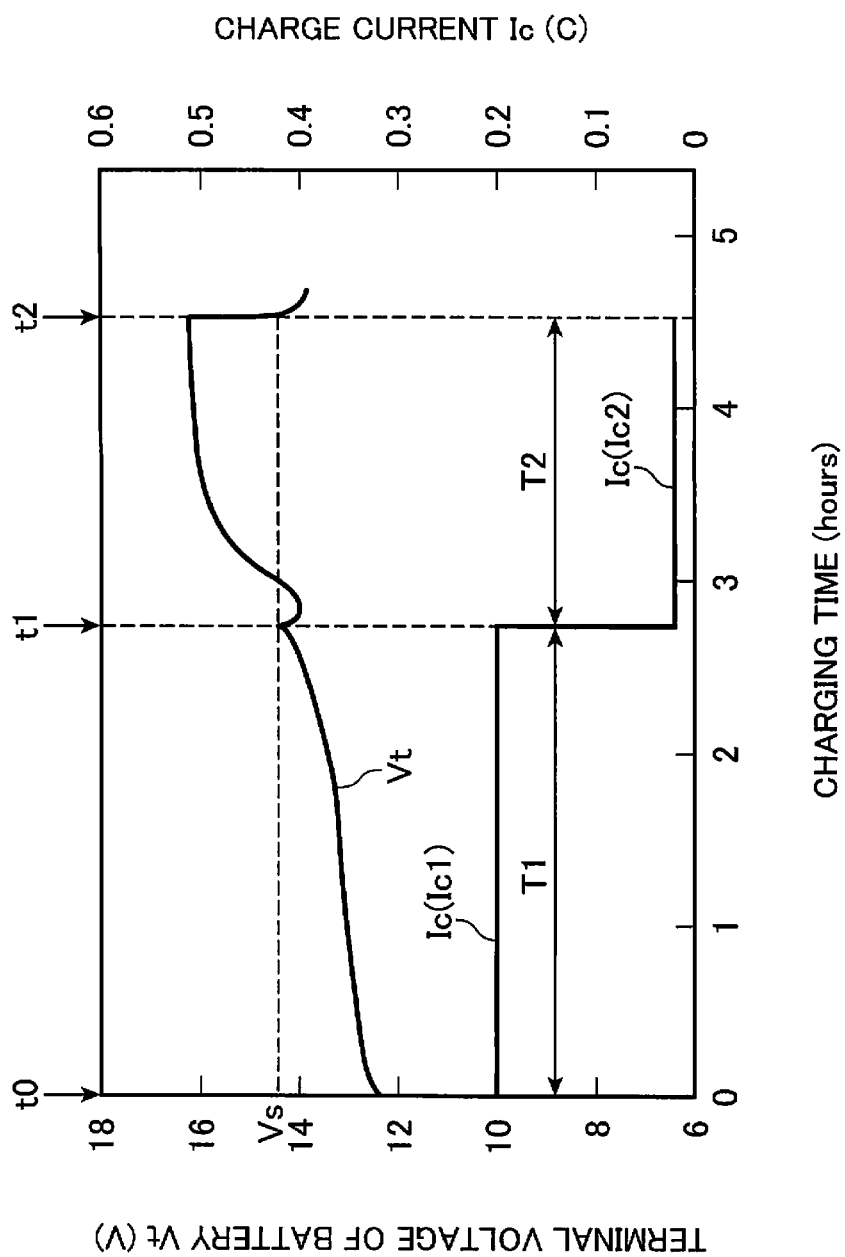
FIG. 2 is a diagram schematically showing the transition of the terminal voltage and the charging current of the lead storage battery to be charged in this embodiment.

FIG. 2 is a diagram schematically showing the transition of the terminal voltage Vt and the charging current Ic of the lead storage battery 10 to be charged in this embodiment. In FIG. 2, "charging current Ic (C)" signifies that the current value is represented in units of "1C". "1C" represents the current value where the state of charge (SOC) of the battery becomes 0% in 1 hour when discharge is performed with a current value of 1C until the state of charge (SOC) of the battery reaches 0% from 100%. In other words, "1C" represents the current value where the stored electric quantity of the battery becomes zero in 1 hour when the nominal capacity value of the battery is discharge with a current value of 1C. Note that "C" is also represented as "It". The functions of the respective parts of the charge control circuit 30 are now described with reference to FIG. 1 and FIG. 2.

The voltage detection circuit 33 detects a terminal voltage Vt of the lead storage battery 10. When the charge switch 32 is operated, the charge control unit 34 starts the constant current charge of the lead storage battery 10 with a pre-set charging current value Ic1 (time t0 of FIG. 2). When the terminal voltage Vt of the lead storage battery 10 detected by the voltage detection circuit 33 reaches a pre-set end-of-charge voltage Vs (time t1 of FIG. 2), the charge control unit 34 proceeds to the charging of the subsequent stage (in this embodiment, the second stage as the final stage). The timer unit 35 clocks a charging time T1 required for the first-stage constant current charge; that is, the charging time T1 from the charge start until the terminal voltage Vt of the lead storage battery 10 reaches the end-of-charge voltage Vs.

In the charging of the subsequent stage (second stage as the final stage), the charge control unit 34 lowers the charging current value from the charging current value Ic1 to a charging current value Ic2, and once again performs the constant current charge. The charge control unit 34 ends the charging when a charging time T2, which is decided as described later, elapses from the charge start of the final stage (n-th stage) (time t2 of FIG. 2). In other words, in the charging of the final stage (second stage), the limitation of the end-of-charge voltage Vs is cancelled and charging is continued until the lapse of the charging time T2. Note that the end-of-charge voltage Vs and the charging current values Ic1, Ic2 of the respective stages are set in advance so that high charging efficiency can be obtained in consideration of the characteristics of the lead storage battery 10. FIG. 2 shows an example where the current value Ic1 of the first-stage charging current Ic is 0.2 C, the current value Ic2 of the second-stage charging current Ic is 0.025 C, and the end-of-charge voltage Vs is 14.4 V.

The storage unit 31 stores a table which is set with a total discharge electric quantity D by associating the total discharge electric quantity D with the plurality of times that are pre-set as the charging time T1 required for the first-stage constant current charge. In this table, the current value Ic1 of the first-stage charging current Ic and the end-of-charge voltage Vs are set as known values. Note that the storage unit 31 may also store a plurality of tables in accordance with different current values Ic1 and end-of-charge voltages Vs. The storage unit 31 stores a first coefficient $\alpha$ and a second coefficient $\beta$ described later ($\alpha > \beta > 1$). The second coefficient $\beta$ is set, for example, as $1.07 \leq \beta \leq 1.15$. The storage unit 31 stores, in this embodiment, $\beta = 1.1$ as the second coefficient $\beta$. The storage unit 31 stores, in this embodiment, the three types of $\alpha = 1.2, 1.5, 1.9$ as the first coefficient $\alpha$. The storage unit 31 stores the current value of the dark current that is supplied from the lead storage battery 10 to the load 20 or the like of the electric vehicle 1 and which flows from the lead storage battery 10 while the power source switch 11 of the electric vehicle 1 is turned OFF.

Here, the term "dark current" includes the minimal current required for the preservation of the vehicle (for example, power supply to the various memories or the like), the current based on a self-discharge that is inherent in the power-generating elements of the lead storage battery 10 or in a circuit or wiring with the lead storage battery 10 built therein, and the small short-circuit current of a level in which the device does not send an error mode, each of which flows while the electric vehicle 1 is stopped. Accordingly, the current value of the dark current can be estimated based on the specification of the electric vehicle 1 and the specification of the lead storage battery 10. Otherwise, the current value of the dark current when the electric vehicle 1 is stopped can be measured in a state where the lead storage battery 10 is built into the electric vehicle 1. The current value (estimated value or measured value) of the dark current obtained as described above is stored in the storage unit 31 in advance. Moreover, the dark current can also be considered a current in which the current value is less than a predetermined level. Here, the predetermined level can be set, for example, not as an absolute value of the current, but as a ratio relative to the nominal capacity of the lead storage battery such as 1/1000 [C] or 1/3000 [C].

The discharge electric quantity acquisition unit 36 acquires the total discharge electric quantity D of the lead storage battery 10 during the period from the end time of the previous charge to the start time of the present charge based on the charging time T1 required for the first-stage constant current charge and clocked by the timer unit 35, and the table stored in the storage unit 31. The discharge electric quantity acquisition unit 36 requests the down time of the electric vehicle 1 to the ECU 23, and receives, from the ECU 23, the down time of the electric vehicle 1 that was clocked by the ECU 23. The discharge electric quantity acquisition unit 36 obtains the first discharge electric quantity D1 of the dark current by multiplying the down time of the electric vehicle 1 clocked by the ECU 23, by the current value of the dark current stored in the storage unit 31. The discharge electric quantity acquisition unit 36 obtains the second discharge electric quantity D2 of a current other than the dark current by subtracting the first discharge electric quantity D1 from the total discharge electric quantity D. To put it differently, the second discharge electric quantity D2 corresponds to the discharge electric quantity when the power source switch 11 of the electric vehicle 1 is in an ON state (that is, the operating time of the electric vehicle 1).

The charge electric quantity computing unit 37 obtains the charge electric quantity C using following Formulas (1) to (3) based on the first discharge electric quantity D1 and the second discharge electric quantity D2 obtained by the discharge electric quantity acquisition unit 36, and the first coefficient α and the second coefficient β stored in the storage unit 31.

$$C1 = D1 \times \alpha \quad (1)$$

$$C2 = D2 \times \beta \quad (2)$$

$$C = C1 + C2 \quad (3)$$

Here, C1 represents the first charge electric quantity corresponding to the first discharge electric quantity D1, and C2 represents the second charge electric quantity corresponding to the second discharge electric quantity D2.

The charge electric quantity computing unit 37 decides the charging time T2 of the final stage (second stage) based on the obtained charge electric quantity C, the charging current values Ic1, Ic2, and the charging time T1 required for the first-stage constant current charge. As described above, the charge control unit 34 ends the charging (time t2 of FIG. 2) when the charging time T2 decided by the charge electric quantity computing unit 37 elapses from the charge start of the final stage (n-th stage) (time t1 of FIG. 2). In this embodiment, the ECU 23 corresponds to an example of the device control unit, the storage unit 31 corresponds to an example of the first storage unit and the second storage unit, the voltage detection circuit 33 corresponds to an example of the voltage detection unit, the discharge electric quantity acquisition unit 36 corresponds to an example of the first acquisition unit and the second acquisition unit, the charge electric quantity computing unit 37 corresponds to an example of the computing unit, the electric vehicle 1 corresponds to an example of the battery-operated device, and the charge circuit 3 corresponds to an example of the charging unit.

Figure 3:
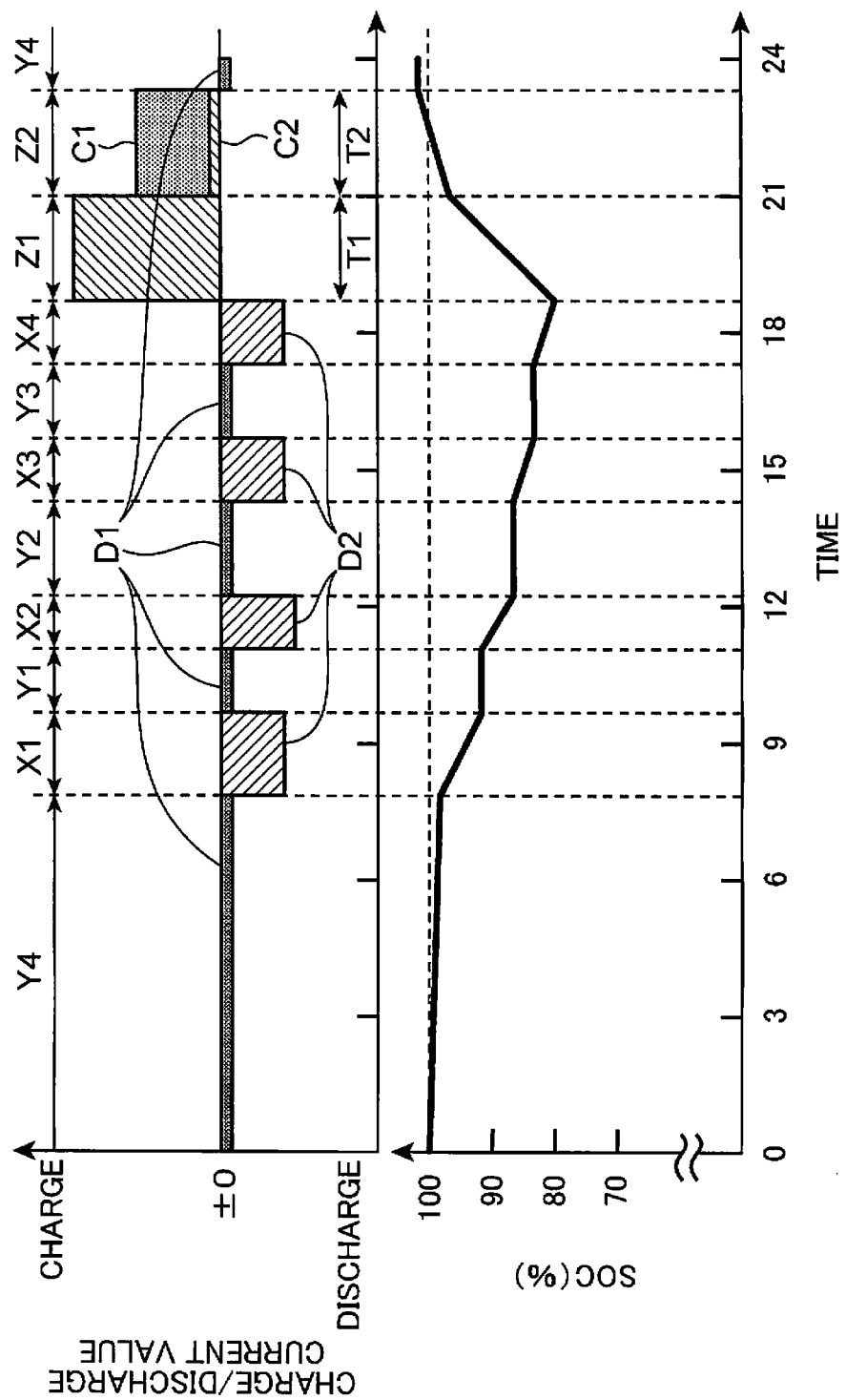
FIG. 3 is a diagram showing a mode of charging the lead storage battery, after partially discharging the lead storage battery, and shows a mode of charging the lead storage battery with the method of this embodiment.
Figure 4:
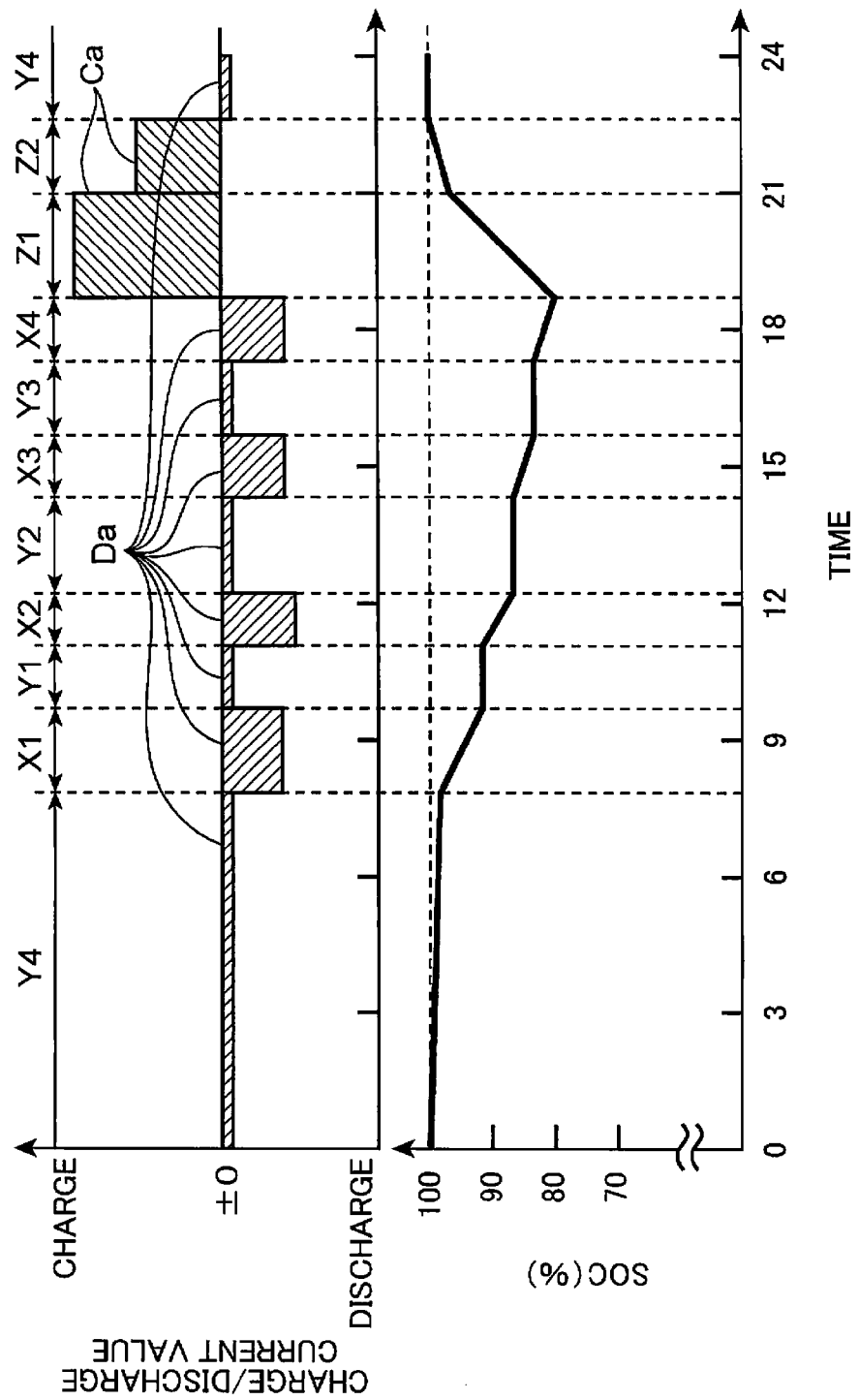
FIG. 4 is a diagram showing a mode of charging the lead storage battery, after partially discharging the lead storage battery, and shows a mode of charging the lead storage battery with a conventional method as a comparative example.

FIG. 3 and FIG. 4 are diagrams showing a mode of charging the lead storage battery, after partially discharging the lead storage battery. FIG. 3 shows a mode of charging with the method of this embodiment, and FIG. 4 shows a mode of charging with a conventional method as a comparative example. Specifically, FIG. 3 and FIG. 4 show patterns where the special electric vehicle 1 which uses the lead storage battery 10 as the power source is driven in four drive periods (X1 to X4) from morning to night with three down periods (Y1 to Y3) in between, and thereafter charge is performed (Z1 to Z2). Note that, as described with reference to FIG. 1 and FIG. 2, the charging conditions are the two-stage constant current charge where the charging current Ic is lowered from the current value Ic1 to the current value Ic2 and the charging proceeds to the second-stage charging when the lead storage battery 10 reaches the predetermined end-of-charge voltage Vs in the first-stage charging, and charging is continued until the predetermined charging time T2 elapses after the lead storage battery 10 reaches the end-of-charge voltage Vs (charging current Ic is Ic1>Ic2). In FIG. 3 and FIG. 4, the first-stage charging period is shown as Z1 and the second-stage charging period is shown as Z2.

Moreover, after the end of the charging periods Z1 to Z2, the lead storage battery 10 will enter the down period Y4 until reaching the morning drive period X1. During the down periods Y1 to Y4, the lead storage battery 10 will continue the dark current discharge. Here, as described above, a dark current refers to the minimal current required for the preservation of the vehicle (for example, power supply to the various memories or the like), or the current based on a self-discharge that is inherent in the power-generating elements of the lead storage battery 10 or in a circuit or wiring with the lead storage battery 10 built therein.

During the dark current discharge in the down periods Y1 to Y4, lead sulfate as the discharge product of the lead storage battery 10 can grow slowly. Thus, regardless of the depth of discharge, in comparison to the lead sulfate that is generated during the drive periods X1 to X4, crystals of the lead sulfate that are generated during the down periods Y1 to Y4 will increase in size. This kind of lead sulfate of large crystals is inactive in comparison to lead sulfate of small crystals as the discharge product of a normal current, and the charge reaction becomes dull. If no consideration is given to the generation of this kind of lead sulfate of large crystals and, as shown in FIG. 4, the discharge electric quantity of the dark current is combined with the normal discharge electric quantity, and charging is performed only in the charge electric quantity Ca obtained by multiplying a given coefficient (for example, 1.07 to 1.15) by the combined total discharge electric quantity Da, most of the lead sulfate of large crystals cannot be returned to the charge product. Consequently, insufficient charging will occur, and this will lead to the deterioration in the life property of the lead storage battery 10.

With the charging mode shown in FIG. 3, unlike the conventional method shown in FIG. 4, the total discharge electric quantity D is obtained as a sum of the second discharge electric quantity D2 during the drive periods (X1 to X4); that is, of a normal discharge (discharge based on a current other than the dark current), and the first discharge electric quantity D1 of the dark current during the down periods (Y1 to Y4) (discharge electric quantity acquisition unit 36 of FIG. 1). In addition, the charge electric quantity C required for a full charge is obtained as a sum of the first charge electric quantity C1 obtained by multiplying the first discharge electric quantity D1 by the first coefficient α, and the second charge electric quantity C2 obtained by multiplying the second discharge electric quantity D2 by the second coefficient β (charge electric quantity computing unit 37 of FIG. 1). Here, the second coefficient β may be the foregoing conventional value (that is, for example, 1.07 to 1.15), but the first coefficient α must be a value that is greater than the second coefficient β.

As described above, if the first coefficient α to be multiplied by the first discharge electric quantity D1 of the dark current is set to be larger than the second coefficient β to be multiplied by the second discharge electric quantity D2 of the (normal) current other than the dark current and charging is performed by setting the first charge electric quantity C1 (=α×D1) to a large value, the lead sulfate in which the crystals thereof increased in size due to the discharge based on a dark current can be eliminated easily. In addition, as shown in FIG. 2 and FIG. 3, if the charge electric quantity of the final-stage in the multi-stage constant current charge, in which the current value is small, is set to be sufficiently large, this is preferable since the electric quantity required for eliminating the lead sulfate of large crystals can be performed with a low current that is advantageous in eliminating the lead sulfate of large crystals. In order to realize the above, if the required charge electric quantity C is the same, desirably, the final-stage charging time T2 is made longer as the ratio of the first discharge electric quantity D1 of the dark current relative to the total discharge electric quantity D is relatively larger. Specifically, it is desirable to cause the ratio D1/D relative to the total discharge electric quantity D of the first discharge electric quantity D1 of the dark current and the size of the first coefficient α to reasonably correspond such as by increasing the first coefficient α as the ratio D1/D increases. Thus, the storage unit 31 stores, in this embodiment, three types of α=1.2, 1.5, 1.9 as the first coefficient α as described above. These three types of first coefficients α are set in advance corresponding to the ratio D1/D. In addition, the charge electric quantity computing unit 37 obtains D1/D from the total discharge electric quantity D and the first discharge electric quantity D1 acquired by the discharge electric quantity acquisition unit 36, and, among the plurality of values (three types in this embodiment) stored as the first coefficients α in the storage unit 31, a value corresponding to the ratio D1/D is used as the first coefficient α.

EXAMPLES

The effects of the foregoing embodiment of the present invention are now shown with reference to the following examples and comparative examples.

Figure 6:
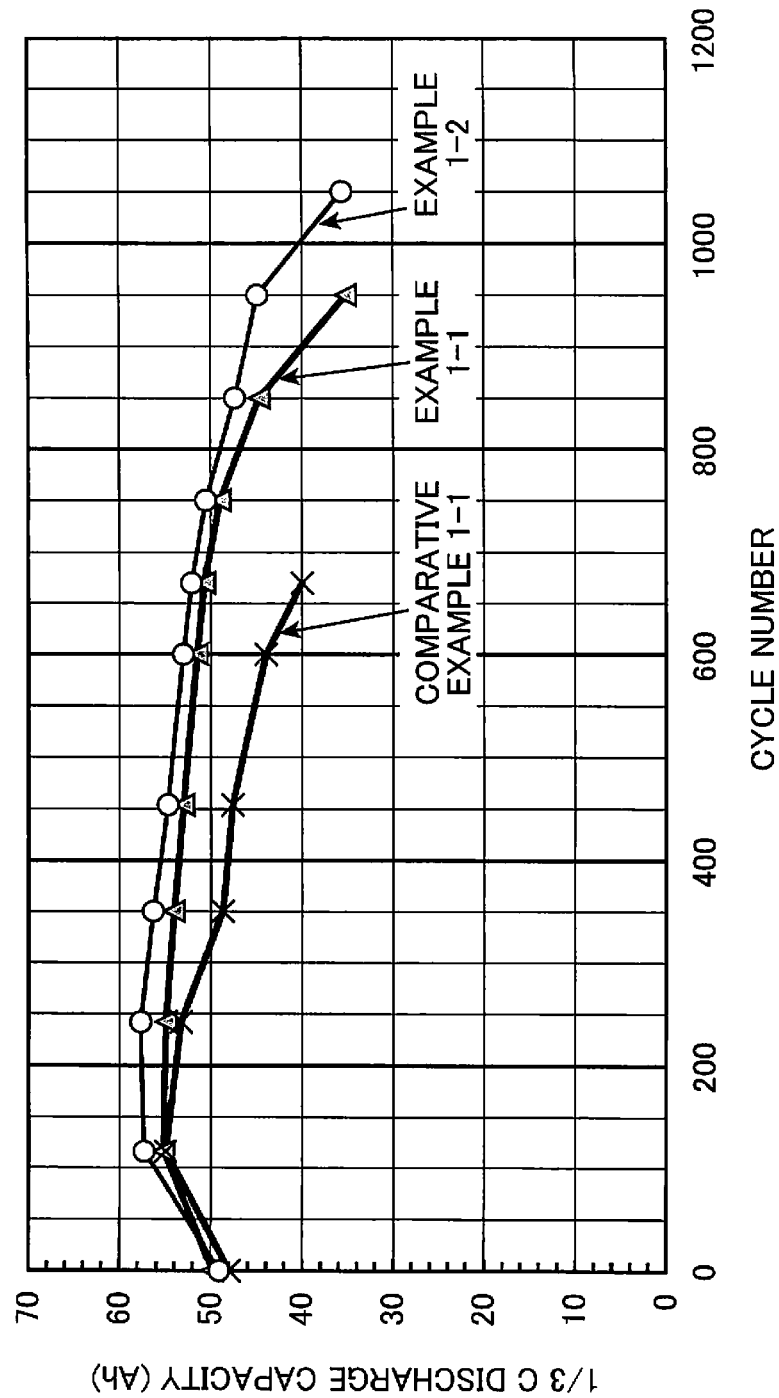
FIG. 6 is a diagram showing the transition of the discharge capacity of the lead storage battery in the examples and the comparative example.

FIG. 5 is a diagram showing, in a tabular form, the discharge pattern of the examples and the comparative examples. FIG. 6 is a diagram showing the transition of the discharge capacity of the lead storage battery in the examples and the comparative example. As the lead storage battery, used was EC-FV1260 (manufactured by Panasonic Storage Battery Co., Ltd.) having a nominal voltage of 12 V and a nominal capacity of 60 Ah. This lead storage battery was repeatedly charged and discharged as shown in FIG. 3 in the examples, and repeatedly charged and discharged as shown in FIG. 4 in the comparative examples. In other words, as shown in FIG. 5, in both the examples and the comparative examples, discharge was performed with a relatively large current value of ⅓ [C] during the drive periods X1 to X4, discharge was performed with a small current value of 0.01 [C] during the down periods Y1 to Y4, and a two-stage constant current charge was performed after the drive period X4. With this two-stage constant current charge, as with the example shown in FIG. 2 in the foregoing embodiment, the first-stage charging current value Ic1=0.2 [C], the second-stage charging current value Ic2=0.025 [C], and the first-stage end-of-charge voltage Vs=14.4 V. As described later, the examples and the comparative examples differ with respect to the second-stage charging time.

In both the examples and the comparative examples, discharge was performed in the order of the three types of discharge patterns L to N shown in FIG. 5. In other words, with the discharge of discharge pattern L→two-stage constant current charge→discharge of discharge pattern M→two-stage constant current charge→discharge of discharge pattern N→two-stage constant current charge as one set, the set was repeated. In addition, the discharge capacity of the lead storage battery was measured in appropriate intervals according to the following procedure.

Foremost, pre-discharge is performed until the terminal voltage of the lead storage battery reaches an end voltage of 9.9 V with a constant current of ⅓ [C]. At this point, the capacity is not measured. Subsequently, the two-stage constant current charge is performed. With the two-stage constant current charge, the first-stage charging current value is set to 0.2 [C], and the first-stage end-of-charge voltage is set to 14.4 V. Moreover, the second-stage charging current value is set to 0.025 [C], and the second-stage charging time is set to (60−R)/1.5 [hours] relative to the first-stage charge electric quantity R. In other words, the first-stage charge electric quantity R can be obtained from the first-stage charging current value and the charging time. Since the second-stage charging current value is 0.025 [C] and the nominal capacity of the lead storage battery is 60 Ah, the second-stage current value will be 1.5 A. Accordingly, as a result of setting the second-stage charging time to (60−R)/1.5 [hours], the lead storage battery can be fully charged.

Subsequently, discharge is performed until the terminal voltage of the lead storage battery reaches an end voltage of 9.9 V with a constant current of ⅓ [C]. Here, the discharge capacity is measured. In other words, the discharge capacity is measured based on the discharge time from the full charge to reaching the end voltage of 9.9 V, and the current value of the discharge current as the constant current. Subsequently, the two-stage constant current charge, which is the same as the foregoing charging, is ultimately performed as a pre-charge, and the measurement of the discharge capacity is thereby ended.

Comparative Example 1-1

Foremost, discharge of the drive periods X1 to X4 and the down periods Y1 to Y4 shown with the discharge pattern L of FIG. 5 was performed. Then, the two-stage constant current charge was performed after the drive period X4 so as to achieve the charge electric quantity Ca which is obtained by combining the discharge electric quantity D2 during the drive periods X1 to X4 and the discharge electric quantity D1 during the down periods Y1 to Y4 to obtain the total discharge electric quantity Da, and by multiplying the total discharge electric quantity Da by 1.1 (value equivalent to the second coefficient β) as the coefficient (Ca=Da×1.1). Subsequently, discharge of the drive periods X1 to X4 and the down periods Y1 to Y4 shown with the discharge pattern M of FIG. 5 was performed, and charging (charge electric quantity Ca=Da×1.1) under the same conditions as after the discharge pattern L was performed. In addition, discharge of the drive periods X1 to X4 and the down periods Y1 to Y4 shown with the discharge pattern N of FIG. 5 was performed, and charging (charge electric quantity Ca=Da×1.1) under the same conditions as after the discharge pattern L was performed. The foregoing charge and discharge correspond to the mode of charging to a fully charged state after performing a discharge in which the SOC reaches 50%. The transition of the discharge capacity measured according to the foregoing procedures is shown in FIG. 6.

Example 1-1

As described above, as with Comparative Example 1-1, the two-stage constant current charge is performed after the respective discharge patterns L to N. However, in Example 1-1, as described with the foregoing embodiment, the total discharge electric quantity D is divided into the second discharge electric quantity D2 during the drive periods X1 to X4 and the first discharge electric quantity D1 during the down periods Y1 to Y4. In addition, the charge electric quantity C is obtained as the sum of the first charge electric quantity C1 obtained by multiplying the first discharge electric quantity D1 by 1.5 as the first coefficient $\alpha$, and the second charge electric quantity C2 obtained by multiplying the second discharge electric quantity D2 by 1.1 as the second coefficient $\beta$. Otherwise, the same charge and discharge as Comparative Example 1-1 were repeated. The transition of the discharge capacity measured with the same procedures as Comparative Example 1-1 is also shown in FIG. 6.

Note that, with respect to the charging conditions, the second-stage charging time (charging time T2) as the last stage is set to be longer in the amount that the calculated value of the charge electric quantity C increases relative to Comparative Example 1-1.

Example 1-2

In Example 1-2, the value of the first coefficient $\alpha$ used for calculating the charge electric quantity C is caused to be different in the respective discharge patterns L to N relative to Example 1-1. In other words, in Example 1-2, the charge electric quantity C is obtained by setting the first coefficient $\alpha$ to 1.2 in the case of the discharge pattern L, setting the first coefficient $\alpha$ to 1.5 in the case of the discharge pattern M, and setting the first coefficient $\alpha$ to 1.9 in the case of the discharge pattern N. Otherwise, the same charge and discharge as Example 1-1 were repeated. The transition of the discharge capacity measured with the same procedures as Comparative Example 1-1 is also shown in FIG. 6.

Note that, with respect to the charging conditions, unlike Example 1-1, the second-stage charging time (charging time T2) as the final stage is set to be longer as the calculated value of the first charge electric quantity C1 increases.

As evident from FIG. 6, in comparison to Comparative Example 1-1 which does not give consideration to the first discharge electric quantity D1 of the dark current, Examples 1-1 and 1-2 showed favorable life property. Among the examples, Example 1-2 in which the first coefficient $\alpha$ was increased relative to the first discharge electric quantity D1 of the dark current and the second-stage charging time (charging time T2) as the final stage was extended showed extremely superior life property. As the reason for this, while a sufficient charge electric quantity C is supplied immediately after the increase in the lead sulfate of large crystals (increase in the first discharge electric quantity D1 of the dark current) to eliminate such lead sulfate of large crystals, overcharge was avoided by decreasing the charge electric quantity C in other cases.

Note that, when the repetitive pattern of the drive periods and the down periods of the battery-operated device (for example, electric vehicle) mounted with a lead storage battery is substantially constant (for example, when discharge patterns L to N are repeated evenly), the same or better effect than Example 1-1 can at least be expected when using, as a fixed value, a representative value based on an average value or the like of the first coefficient $\alpha$ that is suitable for the respective discharge patterns (for example, average value 1.53 of 1.2, 1.5, 1.9 which were used as the coefficient $\alpha$ of the discharge patterns L to N). In this case, the storage unit 31 only needs to store one type of first coefficient $\alpha$ which is set based on the usage of the battery-operated device such as the electric vehicle 1 using the lead storage battery 10.

Example 2

Figure 7:
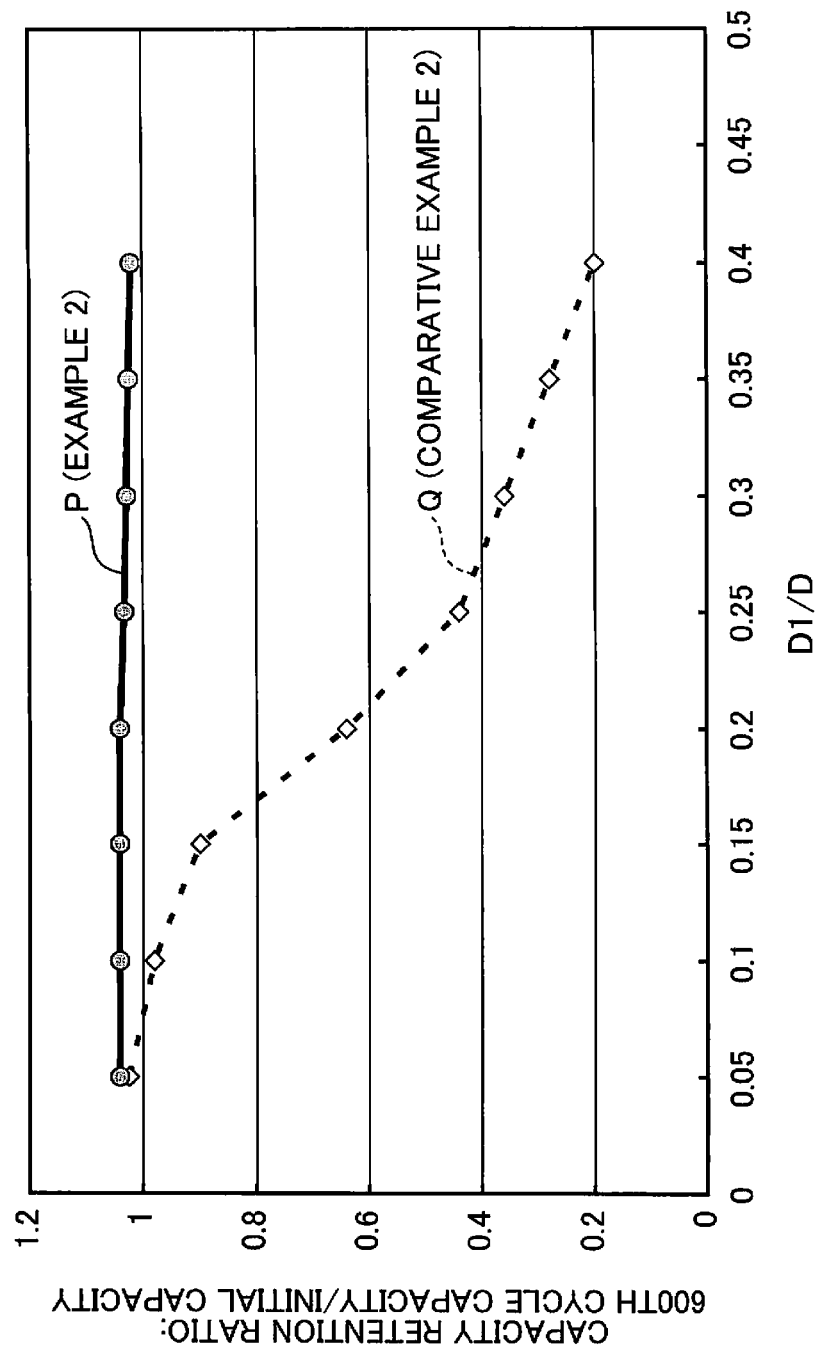
FIG. 7 is a diagram showing a retention ratio of the discharge capacity.

FIG. 7 is a diagram showing the retention ratio of the discharge capacity. In Comparative Example 1-1 and Examples 1-1 and 1-2, the three discharge patterns L to N were repeated in order during the discharge, but the effect of the foregoing embodiment of the present invention in the case of repeating the discharge with one discharge pattern is now described.

In Example 2, the second charge electric quantity C2 was obtained by using 1.1 as the second coefficient $\beta$ to be multiplied by the second discharge electric quantity D2 (C2=D2× 1.1). Meanwhile, the first coefficient $\alpha$ to be multiplied by the first discharge electric quantity D1 was set to $\alpha$=1.2 upon repeating the discharge pattern L (D/D=0.05), set to $\alpha$=1.5 upon repeating the discharge pattern M (D1/D=0.2), and set to $\alpha$=1.9 upon repeating the discharge pattern N (D1/D=0.4) in order to obtain the first charge electric quantity C1 (C1=D1×$\alpha$).

In addition, as a discharge pattern that is different from the discharge patterns L to N shown in FIG. 5, the first coefficient a was set to $\alpha$=1.3 upon repeating the discharge pattern L2 (D1/D=0.1), set to $\alpha$=1.4 upon repeating the discharge pattern L3 (D1/D=0.15), set to $\alpha$=1.6 upon repeating the discharge pattern M2 (D1/D=0.25), set to $\alpha$=1.7 upon repeating the discharge pattern M3 (D1/D=0.3), and set to $\alpha$=1.8 upon repeating the discharge pattern M4 (D1/D=0.35) in order to obtain the first charge electric quantity C1 (C1=D1×$\alpha$).

In addition, the same two-stage constant current charge as foregoing Comparative Example 1-1 and the like was performed so as to correspond to the charge electric quantity C obtained by adding the first charge electric quantity C1 and the second charge electric quantity C2. The foregoing charge and discharge were repeated to measure the discharge capacity of the lead storage battery according to the foregoing procedures on the 600th cycle. The results are shown as symbol P in FIG. 7 as the capacity retention ratio, which is the ratio of the capacity of the 600th cycle relative to the initial capacity.

Meanwhile, as Comparative Example 2, the same two-stage constant current charge as foregoing Comparative Example 1-1 and the like was performed by focusing only on the total discharge electric quantity Da irrespective of the discharge patterns L to N, so as to correspond to the charge electric quantity Ca obtained by multiplying the total discharge electric quantity Da by 1.1 (value equivalent to the second coefficient $\beta$) as the coefficient (Ca=Da×1.1). The foregoing charge and discharge were repeated to measure the discharge capacity of the lead storage battery according to the foregoing procedures on the 600th cycle. The results are shown as symbol Q in FIG. 7 as the capacity retention ratio, which is the ratio of the capacity of the 600th cycle relative to the initial capacity.

In FIG. 7, based on the degree of the divergence between the capacity retention ratio P and the capacity retention ratio Q, it is evident that the effect of the foregoing embodiment of the present invention becomes notable when the ratio D1/D of the first discharge electric quantity D1 of the dark current relative to the total discharge electric quantity D is 0.2 or more.

In other words, as shown in FIG. 7, the capacity retention ratio Q gradually decreases to the ratio D1/D=0.15 relative to the capacity retention ratio P. Upon becoming ratio D1/D=0.15 or more, the decreasing level of the capacity retention ratio Q relative to the capacity retention ratio P increases. In addition, upon becoming ratio D1/D=0.2 or more, the capacity retention ratio Q becomes 90% or less relative to the capacity retention ratio P. Thus, it can be said that the effect of the foregoing embodiment starts to yield when the ratio D1/D=0.15 or more, and the effect of the foregoing embodiment becomes notable when the ratio D1/D=0.2 or more.

(Other Embodiments)

The present invention is not limited to the foregoing embodiment. The other embodiments of the present invention are described below.

Figure 8:
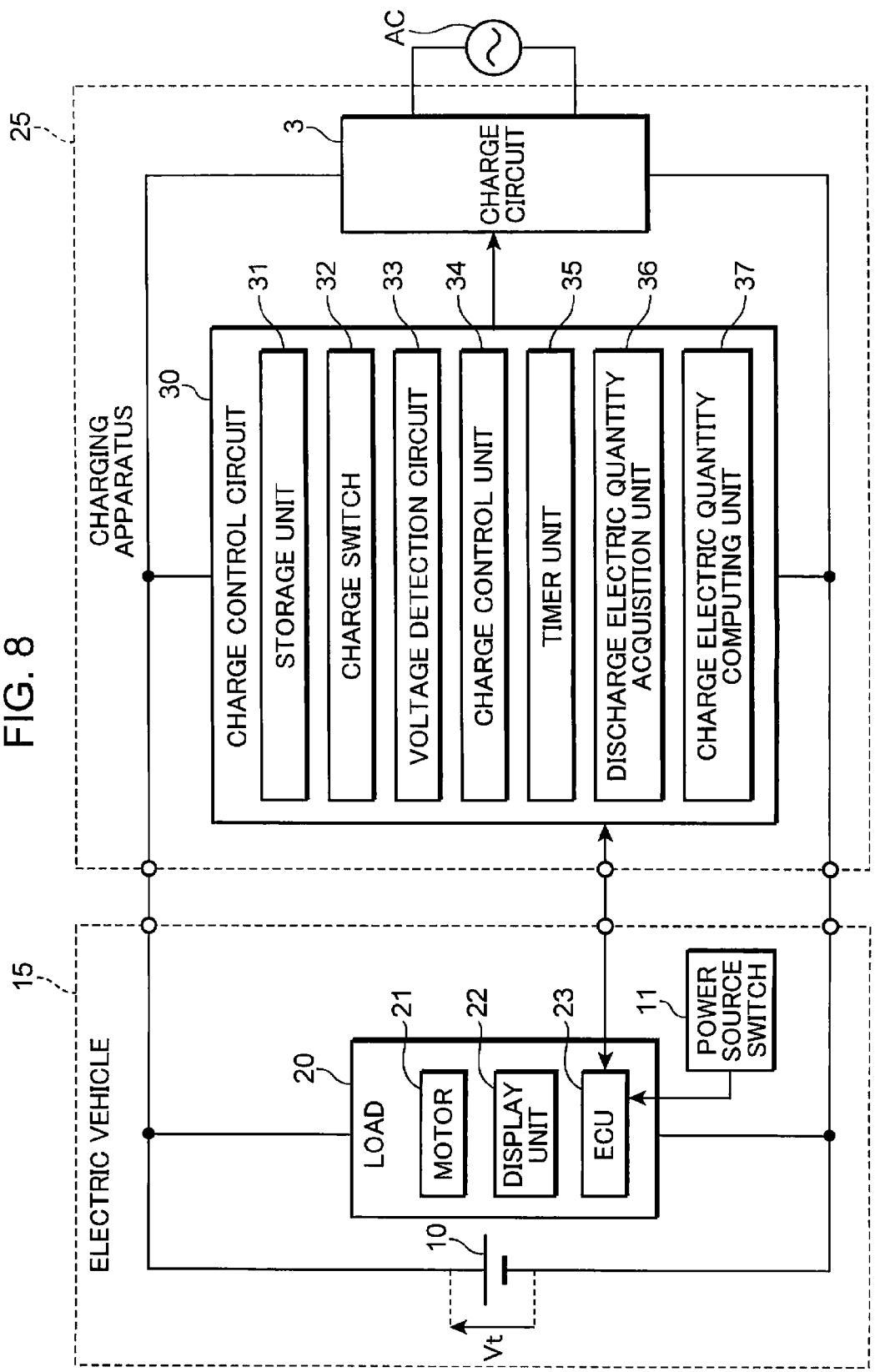
FIG. 8 is a block diagram showing a state where the electric vehicle is connected to the charging apparatus according to an embodiment of the present invention.

(1) FIG. 8 is a block diagram showing a state where the electric vehicle is connected to the charging apparatus according to an embodiment of the present invention. With the embodiment shown in FIG. 8, unlike the foregoing embodiment, the charge control circuit is provided to the charging apparatus, rather than to the electric vehicle. In other words, an electric vehicle 15 shown in FIG. 8 comprises the lead storage battery 10, the power source switch 11, and the load 20. Moreover, a charging apparatus 25 shown in FIG. 8 comprises the charge circuit 3 and the charge control circuit 30 according to an embodiment of the present invention. In FIG. 8, the same reference numeral is given to the same element as the foregoing embodiment shown in FIG. 1. The charge control circuit 30 shown in FIG. 8 has the same functions as the foregoing embodiment shown in FIG. 1. In other words, when an operator of the electric vehicle 15 connects the electric vehicle 15 to the charging apparatus 25 and operates the charge switch 32 of the charge control circuit 30 provided to the charging apparatus 25, the charge control circuit 30 controls the charge circuit 3 and the lead storage battery 10 of the electric vehicle 15 is charged by the charging current supplied from the charge circuit 3. In the embodiment shown in FIG. 8 also, as with the foregoing embodiment, it is possible to suitably charge the lead storage battery 10 without deteriorating the life property.

(2) In the foregoing embodiment, while the discharge electric quantity acquisition unit 36 obtains the first discharge electric quantity D1 of the dark current by multiplying the down time of the electric vehicle 1 clocked by the ECU 23 by the current value of the dark current stored in the storage unit 31, the present invention is not limited thereto. In comparison to the current that is supplied from the lead storage battery 10 for driving the motor 21, the current that is supplied for driving the load 20 other than the motor 21 such as the display unit 22 or the ECU 23 is extremely small. Thus, even if the power source switch 11 of the electric vehicle 1 is turned ON, the current that flows from the lead storage battery 10 while the motor 21 is stopped can be considered a dark current that is less than the foregoing predetermined level (for example, 1/1000 [C]). Thus, the discharge while the motor 21 is stopped may be included in the first discharge electric quantity D1. This modified embodiment is now described mainly regarding the differences in comparison to the foregoing embodiment.

In addition to the down time of the electric vehicle 1, the ECU 23 clocks the motor stop time in which the power source switch 11 of the electric vehicle 1 is turned ON and the motor 21 is stopped. The ECU 23 notifies the discharge electric quantity acquisition unit 36 of the clocked down time and motor stop time of the electric vehicle 1 according to a request from the discharge electric quantity acquisition unit 36. The storage unit 31 stores the current value of a first current that is less than the foregoing predetermined level which flows from the lead storage battery 10 during the down time of the electric vehicle 1. The storage unit 31 stores the current value of a second current that is less than the foregoing predetermined level which flows from the lead storage battery 10 during the motor stop time in which the power source switch 11 of the electric vehicle 1 is turned ON and the motor 21 is stopped.

The discharge electric quantity acquisition unit 36 obtains a discharge electric quantity D11 of the first current by multiplying the down time of the electric vehicle 1 clocked by the ECU 23, by the current value of the first current stored in the storage unit 31. The discharge electric quantity acquisition unit 36 obtains a discharge electric quantity D12 of the second current by multiplying the motor stop time clocked by the ECU 23, by the current value of the second current stored in the storage unit 31. The discharge electric quantity acquisition unit 36 obtains the first discharge electric quantity D1 of the current that is less than the foregoing predetermined level by adding the discharge electric quantity D11 and the discharge electric quantity D12.

Other than the above points, this modified embodiment is the same as the foregoing embodiment. Even in this modified embodiment, as with the foregoing embodiment, it is possible to suitably charge the lead storage battery 10 without deteriorating the life property. In this modified embodiment, the motor 21 corresponds to an example of a second load, the display unit 22 and the ECU 23 correspond to an example of a first load, the storage unit 31 corresponds to an example of a third storage unit, and the discharge electric quantity acquisition unit 36 corresponds to an example of a first acquisition unit and a third acquisition unit. This modified embodiment can also be applied to the embodiment shown in FIG. 8.

(3) In the foregoing embodiment, while the charge control circuit 30 is provided separately from the ECU 23, the present invention is not limited thereto. For example, the configuration may be such that the functions of the charge control unit 34, the timer unit 35, the discharge electric quantity acquisition unit 36, and the charge electric quantity computing unit 37 of the charge control circuit 30 are realized by the ECU 23.

(4) In the foregoing embodiment, while the discharge electric quantity acquisition unit 36 acquires the total discharge electric quantity by using a table that is previously stored in the storage unit 31, the present invention is not limited thereto. The charge control circuit 30 may comprise, for example, an electric quantity integrator. The electrical quantity integrator may be used to respectively integrate, during the discharge, the first discharge electric quantity D1 of a discharge in which a current value is less than the foregoing predetermined level, and the second discharge electric quantity D2 of a discharge in which a current value is not less than the foregoing predetermined level. It is thereby possible to accurately obtain the first discharge electric quantity D1 and the second discharge electric quantity D2.

(5) In the foregoing embodiment, while n=2 in the multi-stage (n-stage) constant current charge, the present invention is not limited thereto, and n may be 3 or more.

(6) In the foregoing embodiment, while an electric vehicle is described as an example, the present invention is not limited thereto. For example, the present invention can also be applied to a battery-operated device that is not equipped with an auxiliary power source, comprises a lead storage battery as its sole power source, and is configured such that a large current that is not less than the foregoing predetermined level is supplied from the lead storage battery to a load such as a motor, and a dark current that is less than the foregoing predetermined level flows from the lead storage battery. It is possible to suitably charge the lead storage battery provided to this kind of battery-operated device without deteriorating the life property. In addition, as an example of the above battery-operated device, there is a photovoltaic system comprising a lead storage battery, a street lamp as a load, and a photoelectric conversion element which converts sunlight into power and charges the lead storage battery with the converted power. With this photovoltaic system, when the lighting time of the street lamp is short, the ratio of the discharge electric quantity of the dark current relative to the total discharge electric quantity will increase. Accordingly, even in this photovoltaic system, it is possible to suitably charge the lead storage battery provided to the photovoltaic system without deteriorating the life property of the battery.

Note that the foregoing specific embodiments mainly include the invention having the following configuration.

A charge control circuit according to one aspect of the present invention is a charge control circuit that controls a charging unit which charges a lead storage battery used as a power source of a battery-operated device, includes: a first acquisition unit that acquires, according to an instruction of charge start, a total discharge electric quantity of the lead storage battery during a period from an end time of a previous charge to a start time of a present charge, the total discharge electric quantity being separated into a first discharge electric quantity which is a discharge electric quantity of a discharge current having a current value of less than a predetermined level, and a second discharge electric quantity which is a discharge electric quantity of a discharge current having a current value of not less than the predetermined level; a computing unit that obtains a first charge electric quantity corresponding to the first discharge electric quantity acquired by the first acquisition unit, a second charge electric quantity corresponding to the second discharge electric quantity acquired by the first acquisition unit, and a charge electric quantity required for charging the lead storage battery as a sum of the obtained first charge electric quantity and second charge electric quantity; and a charge control unit that controls a charge of the lead storage battery by the charging unit based on the charge electric quantity obtained by the computing unit.

According to the foregoing configuration, the first acquisition unit acquires, according to an instruction of charge start, a total discharge electric quantity of the lead storage battery during a period from an end time of a previous charge to a start time of a present charge, the total discharge electric quantity being separated into a first discharge electric quantity which is a discharge electric quantity of a discharge current having a current value of less than a predetermined level, and a second discharge electric quantity which is a discharge electric quantity of a discharge current having a current value of not less than the predetermined level. The computing unit obtains a first charge electric quantity corresponding to the first discharge electric quantity acquired by the first acquisition unit, a second charge electric quantity corresponding to the second discharge electric quantity acquired by the first acquisition unit, and a charge electric quantity required for charging the lead storage battery as a sum of the obtained first charge electric quantity and second charge electric quantity. The charge control unit controls a charge of the lead storage battery by the charging unit based on the charge electric quantity obtained by the computing unit.

When the first discharge electric quantity, which is a discharge electric quantity of a discharge current having a current value of less than a predetermined level, increases, since the current value of the discharge current is less than a predetermined level which is small, the size of crystals of the lead sulfate generated by the discharge increases. Accordingly, when the charge electric quantity is insufficient, the lead sulfate crystals are not eliminated and will remain. However, according to the foregoing configuration, the discharge electric quantity acquisition unit acquires the total discharge electric quantity by dividing into the first discharge electric quantity and the second discharge electric quantity, and the charge electric quantity computing unit separately obtains the first charge electric quantity corresponding to the first discharge electric quantity and the second charge electric quantity corresponding to the second discharge electric quantity. It is thereby possible to prevent the charge electric quantity from becoming insufficient. Consequently, the lead storage battery can be suitably charged without lowering the life property.

Moreover, preferably, the foregoing charge control circuit further comprises a first storage unit that stores a first coefficient which is set in advance, and a second coefficient which is set to be smaller than the first coefficient and greater than 1, wherein the computing unit obtains the first charge electric quantity by multiplying the first discharge electric quantity acquired by the first acquisition unit by the first coefficient stored in the first storage unit, and obtains the second charge electric quantity by multiplying the second discharge electric quantity acquired by the first acquisition unit by the second coefficient stored in the first storage unit.

According to the foregoing configuration, the first storage unit stores a first coefficient which is set in advance, and a second coefficient which is set to be smaller than the first coefficient and greater than 1. The computing unit obtains the first charge electric quantity by multiplying the first discharge electric quantity acquired by the first acquisition unit by the first coefficient stored in the first storage unit. Moreover, the computing unit obtains the second charge electric quantity by multiplying the second discharge electric quantity acquired by the first acquisition unit by the second coefficient stored in the first storage unit. Accordingly, since the first coefficient is set to be greater than the second coefficient, it is possible to more reliably prevent the first charge electric quantity corresponding to the first discharge electric quantity from becoming insufficient.

Moreover, in the foregoing charge control circuit, preferably, the first storage unit stores a plurality of the first coefficients in accordance with a size of a ratio of the first discharge electric quantity relative to the total discharge electric quantity, the plurality of first coefficients have a larger numerical value as the size of the ratio is greater, and the computing unit obtains the ratio of the first discharge electric quantity relative to the total discharge electric quantity, and uses the first coefficient corresponding to the obtained ratio among the plurality of first coefficients stored in the first storage unit.

According to the foregoing configuration, the first storage unit stores a plurality of the first coefficients in accordance with a size of a ratio of the first discharge electric quantity relative to the total discharge electric quantity. The plurality of first coefficients have a larger numerical value as the size of the ratio is greater. The computing unit obtains the ratio of the first discharge electric quantity relative to the total discharge electric quantity, and uses the first coefficient corresponding to the obtained ratio among the plurality of first coefficients stored in the first storage unit. In this way, since a first coefficient with a larger numerical value is used as the ratio of the first discharge electric quantity relative to the total discharge electric quantity is greater, it is possible to more reliably prevent the first charge electric quantity corresponding to the first discharge electric quantity from becoming insufficient.

Moreover, preferably, the foregoing charge control circuit further comprises a second acquisition unit that acquires, according to an instruction of charge start, an OFF time, in which the power source of the battery-operated device is turned OFF, during a period from an end time of a previous charge to a start time of a present charge, and a second storage unit that stores a current value, which is less than the predetermined level, of a dark current flowing from the lead storage battery during the OFF time of the battery-operated device, wherein the first acquisition unit obtains the first discharge electric quantity, based on the OFF time acquired by the second acquisition unit and the current value of the dark current stored in the second storage unit.

According to the foregoing configuration, the second acquisition unit acquires, according to an instruction of charge start, an OFF time, in which the power source of the battery-operated device is turned OFF, during a period from an end time of a previous charge to a start time of a present charge. The second storage unit stores a current value, which is less than the predetermined level, of a dark current flowing from the lead storage battery during the OFF time of the battery-operated device. The first acquisition unit obtains the first discharge electric quantity, based on the OFF time acquired by the second acquisition unit and the current value of the dark current stored in the second storage unit. In this way, the first discharge electric quantity can be easily obtained with a simple configuration based on the OFF time and the current value of the dark current.

Moreover, preferably, in the foregoing charge control circuit, the battery-operated device includes a motor as a drive source, and the charge control circuit further comprises: a third acquisition unit that acquires, according to an instruction of charge start, an OFF time in which the power source of the battery-operated device is turned OFF, and a motor stop time in which the power source of the battery-operated device is turned ON and the motor is stopped, during a period from an end time of a previous charge to a start time of a present charge; and a third storage unit that stores a current value, which is less than the predetermined level, of a first current flowing from the lead storage battery during the OFF time of the battery-operated device, and a current value, which is less than the predetermined level, of a second current flowing from the lead storage battery during the motor stop time of the battery-operated device, wherein the first acquisition unit: obtains a discharge electric quantity of the first current based on the OFF time acquired by the third acquisition unit and the current value of the first current stored in the third storage unit; obtains a discharge electric quantity of the second current based on the motor stop time acquired by the third acquisition unit and the current value of the second current stored in the third storage unit; and obtains, as the first discharge electric quantity, a sum of the discharge electric quantity of the first current and the discharge electric quantity of the second current.

According to the foregoing configuration, the third acquisition unit acquires, according to an instruction of charge start, an OFF time in which the power source of the battery-operated device is turned OFF, and a motor stop time in which the power source of the battery-operated device is turned ON and the motor is stopped, during a period from an end time of a previous charge to a start time of a present charge. The third storage unit stores a current value, which is less than the predetermined level, of a first current flowing from the lead storage battery during the OFF time of the battery-operated device, and a current value, which is less than the predetermined level, of a second current flowing from the lead storage battery during the motor stop time of the battery-operated device. The first acquisition unit obtains a discharge electric quantity of the first current based on the OFF time acquired by the third acquisition unit and the current value of the first current stored in the third storage unit. The first acquisition unit obtains a discharge electric quantity of the second current based on the motor stop time acquired by the third acquisition unit and the current value of the second current stored in the third storage unit. The first acquisition unit obtains, as the first discharge electric quantity, a sum of the discharge electric quantity of the first current and the discharge electric quantity of the second current. Accordingly, the first discharge electric quantity can be easily obtained with a simple configuration.

Moreover, in the foregoing charge control circuit, preferably, the ratio of the first discharge electric quantity relative to the total discharge electric quantity is 0.15 or higher.

According to the foregoing configuration, the ratio of the first discharge electric quantity relative to the total discharge electric quantity is 0.15 or higher. Since the above-described problem is noticeable in the case of the foregoing configuration, superior effects can be obtained by applying the present invention to the foregoing case.

Moreover, preferably, the foregoing charge control circuit further comprises a voltage detection unit that detects a terminal voltage of the lead storage battery, wherein the charge control unit: performs an n-stage (wherein n is an integer of 2 or more) constant current charge of starting a constant current charge with a predetermined charging current value, and proceeding to charge of a subsequent stage with the charging current value decreased when the terminal voltage of the lead storage battery detected by the voltage detection unit reaches a predetermined end-of-charge voltage; performs, in a charge of a final n-th stage, charging irrespective of the terminal voltage of the lead storage battery with a reduced value of or a same value as the charging current value of a previous stage, while clocking an elapsed time from a charge start of the n-th stage; obtains a charged electric quantity used for charging the lead storage battery up to an (n−1)-th stage, based on the charging current value of each of the stages and a time required for the terminal voltage of the lead storage battery to reach the end-of-charge voltage in each of the stages; and decides a charging time in a charge of the final n-th stage based on the charge electric quantity obtained by the computing unit and the obtained charged electric quantity, and ends the charge of the n-th stage when the decided charging time elapses.

According to the foregoing configuration, the voltage detection unit detects a terminal voltage of the lead storage battery. The charge control unit performs an n-stage (wherein n is an integer of 2 or more) constant current charge of starting a constant current charge with a predetermined charging current value, and proceeding to charge of a subsequent stage with the charging current value decreased and when the terminal voltage of the lead storage battery detected by the voltage detection unit reaches a predetermined end-of-charge voltage. Moreover, the charge control unit performs, in a charge of a final n-th stage, charging irrespective of the terminal voltage of the lead storage battery with a reduced value of or a same value as the charging current value of a previous stage, while clocking an elapsed time from a charge start of the n-th stage. Moreover, the charge control unit obtains a charged electric quantity used for charging the lead storage battery up to an (n−1)-th stage, based on the charging current value of each of the stages and a time required for the terminal voltage of the lead storage battery to reach the end-of-charge voltage in each of the stages. Moreover, the charge control unit decides a charging time in a charge of the final n-th stage based on the charge electric quantity obtained by the computing unit and the obtained charged electric quantity, and ends the charge of the n-th stage when the decided charging time elapses.

With this multi-stage constant current charge of two stages or more, if the charging current value is Ik when the number of charging stages is k stages and n is 3 or more, I1>I2> ... > In−1≧In, and if n=2, I1>I2. When this kind of n-stage constant current charge is performed, it is possible to reach the charge of the final-stage (n-th stage) with a small charging current value in a relatively short period of time. Accordingly, this is preferable since charge with a small charging current value is suitable for eliminating lead sulfate of large crystals.

The battery-operated device according to another aspect of the present invention comprises: the foregoing charge control circuit; the lead storage battery to be used as the power source; a first load to which a current, of which a current value is less than the predetermined level, is supplied from the lead storage battery; and a second load to which a current, of which a current value is not less than the predetermined level, is supplied from the lead storage battery.

According to the foregoing configuration, the above-described charge control circuit is provided. The lead storage battery is used as the power source. A first load is a load to which a current, of which a current value is less than the predetermined level, is supplied from the lead storage battery. A second load is a load to which a current, of which a current value is not less than the predetermined level, is supplied from the lead storage battery. When the first discharge electric quantity, which is a discharge electric quantity based on the discharge to the first load having a current value of less than the predetermined level, increases, since the current value of the discharge current, which is less than a predetermined level, is small, the size of crystals of the lead sulfate generated by the discharge increases. Accordingly, when the charge electric quantity is insufficient, the lead sulfate crystals are not eliminated and will remain. However, according to the foregoing configuration, the discharge electric quantity acquisition unit acquires the total discharge electric quantity by dividing into the first discharge electric quantity based on the discharge to the first load and the second discharge electric quantity based on the discharge to the second load. In addition, since the charge electric quantity computing unit obtains the first charge electric quantity corresponding to the first discharge electric quantity, it is possible to prevent the charge electric quantity from becoming insufficient. Consequently, the lead storage battery can be suitably charged without lowering the life property.

Preferably, the foregoing battery-operated device further comprises a power source switch that turns ON/OFF a power supply from the lead storage battery to the second load, and a device control unit that clocks an OFF time, in which the power source switch is turned OFF, from an end time of a previous charge.

According to the foregoing configuration, the power source switch turns ON/OFF a power supply from the lead storage battery to the second load. The device control unit clocks an OFF time, in which the power source switch is turned OFF, from an end time of a previous charge. Even when the power source switch is turned OFF and the power supply to the second load is turned OFF, a dark current having a current value of less than a predetermined level often flows from the lead storage battery. Thus, the time that the dark current is flowing can be accurately confirmed by clocking the OFF time, in which the power source switch is turned OFF, from an end time of a previous charge. Consequently, the first acquisition unit can acquire the first discharge electric quantity.

Preferably, the foregoing battery-operated device further comprises a power source switch that turns ON/OFF a power supply from the lead storage battery to the first load and the second load, and a device control unit that clocks an OFF time, in which the power source switch is turned OFF, from an end time of a previous charge, wherein the second load includes a motor as a drive source, and the device control unit further clocks a time, in which the power source switch is turned ON and the motor is not driven, from an end time of a previous charge.

According to the foregoing configuration, the power source switch turns ON/OFF a power supply from the lead storage battery to the first load and the second load. The device control unit clocks an OFF time, in which the power source switch is turned OFF, from an end time of a previous charge. The second load includes a motor as a drive source. The device control unit further clocks a time, in which the power source switch is turned ON and the motor is not driven, from an end time of a previous charge. Even when the power source switch is turned ON and the power supply to the first load and the second load is turned ON, if the motor is not being driven, a current having a current value of less than a predetermined level often flows from the lead storage battery. Thus, the time that the current of less than a predetermined level is flowing can be accurately confirmed by clocking the time, in which the power source switch is turned ON and the motor is not driven, from an end time of a previous charge. Consequently, the first acquisition unit can acquire the first discharge electric quantity.

The charging apparatus according to yet another aspect of the present invention comprises the above-described charge control circuit, and a charging unit that is controlled by the charge control circuit and charges the lead storage battery.

According to the foregoing configuration, the above-described charge control circuit is provided. The charging unit is controlled by the charge control circuit and charges the lead storage battery. When the first discharge electric quantity, which is a discharge electric quantity of a discharge current having a current value of less than a predetermined level, increases, since the current value of the discharge current is less than a predetermined level which is small, the size of crystals of the lead sulfate generated by the discharge increases. Accordingly, when the charge electric quantity is insufficient, the lead sulfate crystals are not eliminated and will remain. However, according to the foregoing configuration, the discharge electric quantity acquisition unit acquires the total discharge electric quantity by dividing into the first discharge electric quantity and the second discharge electric quantity, and the charge electric quantity computing unit separately obtains the first charge electric quantity corresponding to the first discharge electric quantity and the second charge electric quantity corresponding to the second discharge electric quantity. It is thereby possible to prevent the charge electric quantity from becoming insufficient. Consequently, the lead storage battery can be suitably charged without lowering the life property.

The charging method according to yet another aspect of the present invention is a method of charging a lead storage battery used as a power source of a battery-operated device, comprising: a first step of acquiring, according to an instruction of charge start, a total discharge electric quantity of the lead storage battery during a period from an end time of a previous charge to a start time of a present charge, the total discharge electric quantity being separated into a first discharge electric quantity which is a discharge electric quantity of a discharge current having a current value of less than a predetermined level, and a second discharge electric quantity which is a discharge electric quantity of a discharge current having a current value of not less than the predetermined level; a second step of obtaining a first charge electric quantity corresponding to the first discharge electric quantity acquired in the first step, a second charge electric quantity corresponding to the second discharge electric quantity acquired in the first step, and a charge electric quantity required for charging the lead storage battery as a sum of the obtained first charge electric quantity and second charge electric quantity; and a third step of controlling a charge of the lead storage battery based on the charge electric quantity obtained in the second step.

According to the foregoing configuration, in the first step, a total discharge electric quantity of the lead storage battery during a period from an end time of a previous charge to a start time of a present charge is acquired, according to an instruction of charge start, the total discharge electric quantity being separated into a first discharge electric quantity which is a discharge electric quantity of a discharge current having a current value of less than a predetermined level, and a second discharge electric quantity which is a discharge electric quantity of a discharge current having a current value of not less than the predetermined level. In the second step, a first charge electric quantity corresponding to the first discharge electric quantity acquired in the first step is obtained, a second charge electric quantity corresponding to the second discharge electric quantity acquired in the first step is obtained, and a charge electric quantity required for charging the lead storage battery is obtained as a sum of the obtained first charge electric quantity and second charge electric quantity. In the third step, a charge of the lead storage battery is controlled based on the charge electric quantity obtained in the second step.

When the first discharge electric quantity, which is a discharge electric quantity of a discharge current having a current value of less than a predetermined level, increases, since the current value of the discharge current is less than a predetermined level which is small, the size of crystals of the lead sulfate generated by the discharge increases. Accordingly, when the charge electric quantity is insufficient, the lead sulfate crystals are not eliminated and will remain. However, according to the foregoing configuration, in the first step, the total discharge electric quantity is acquired by dividing into the first discharge electric quantity and the second discharge electric quantity, and in the second step, the first charge electric quantity corresponding to the first discharge electric quantity and the second charge electric quantity corresponding to the second discharge electric quantity are separately obtained. It is thereby possible to prevent the charge electric quantity from becoming insufficient. Consequently, the lead storage battery can be suitably charged without lowering the life property.

According to the present invention, it is possible to prevent the occurrence of insufficient charging even upon repeating the mode of performing partial charging (multi-stage constant current charge) up to a fully charged state after using, only for a short period of time, a battery-operated device such as an electric vehicle which uses a lead storage battery as a main power source. As a result, it is possible to inhibit the deterioration in the life property of the lead storage battery. Accordingly, demands for inexpensive and high-performance lead storage batteries can be further expanded.

Industrial Applicability

The charge control circuit, the battery-operated device, the charging apparatus and the charging method according to the present invention are useful as a circuit, a device, an apparatus and a method for suitably charging a lead storage battery to be used as a main power source of a battery-operated device such as an electric vehicle.

The invention claimed is:

1. A charge control circuit that controls a charging unit which charges a lead storage battery used as a power source of a battery-operated device, comprising:
   a first acquisition unit that acquires, according to an instruction of charge start, a total discharge electric quantity of the lead storage battery during a period from an end time of a previous charge to a start time of a present charge, the total discharge electric quantity being separated into a first discharge electric quantity which is a discharge electric quantity of a discharge current having a current value of less than a predetermined level, and a second discharge electric quantity which is a discharge electric quantity of a discharge current having a current value of not less than the predetermined level;
   a computing unit that obtains a first charge electric quantity corresponding to the first discharge electric quantity acquired by the first acquisition unit, a second charge electric quantity corresponding to the second discharge electric quantity acquired by the first acquisition unit, and a charge electric quantity required for charging the lead storage battery as a sum of the obtained first charge electric quantity and second charge electric quantity; and
   a charge control unit that controls a charge of the lead storage battery by the charging unit based on the charge electric quantity obtained by the computing unit.

2. The charge control circuit according to claim 1, further comprising:
   a first storage unit that stores a first coefficient which is set in advance, and a second coefficient which is set to be smaller than the first coefficient and greater than 1, wherein
   the computing unit obtains the first charge electric quantity by multiplying the first discharge electric quantity acquired by the first acquisition unit by the first coefficient stored in the first storage unit, and obtains the second charge electric quantity by multiplying the second discharge electric quantity acquired by the first acquisition unit by the second coefficient stored in the first storage unit.

3. The charge control circuit according to claim 2, wherein
   the first storage unit stores a plurality of the first coefficients in accordance with a size of a ratio of the first discharge electric quantity relative to the total discharge electric quantity,
   the plurality of first coefficients have a larger numerical value as the size of the ratio is greater, and
   the computing unit obtains the ratio of the first discharge electric quantity relative to the total discharge electric quantity, and uses the first coefficient corresponding to the obtained ratio among the plurality of first coefficients stored in the first storage unit.

4. The charge control circuit according to claim 1, further comprising:
   a second acquisition unit that acquires, according to an instruction of charge start, an OFF time, in which the power source of the battery-operated device is turned OFF, during a period from an end time of a previous charge to a start time of a present charge; and
   a second storage unit that stores a current value, which is less than the predetermined level, of a dark current flowing from the lead storage battery during the OFF time of the battery-operated device, wherein
   the first acquisition unit obtains the first discharge electric quantity, based on the OFF time acquired by the second acquisition unit and the current value of the dark current stored in the second storage unit.

5. The charge control circuit according to claim 1, in which the battery-operated device includes a motor as a drive source, the charge control circuit further comprising:
a third acquisition unit that acquires, according to an instruction of charge start, an OFF time in which the power source of the battery-operated device is turned OFF, and a motor stop time in which the power source of the battery-operated device is turned ON and the motor is stopped, during a period from an end time of a previous charge to a start time of a present charge; and
a third storage unit that stores a current value, which is less than the predetermined level, of a first current flowing from the lead storage battery during the OFF time of the battery-operated device, and a current value, which is less than the predetermined level, of a second current flowing from the lead storage battery during the motor stop time of the battery-operated device, wherein
the first acquisition unit:
obtains a discharge electric quantity of the first current based on the OFF time acquired by the third acquisition unit and the current value of the first current stored in the third storage unit;
obtains a discharge electric quantity of the second current based on the motor stop time acquired by the third acquisition unit and the current value of the second current stored in the third storage unit; and
obtains, as the first discharge electric quantity, a sum of the discharge electric quantity of the first current and the discharge electric quantity of the second current.

6. The charge control circuit according to claim 1, wherein the ratio of the first discharge electric quantity relative to the total discharge electric quantity is 0.15 or higher.

7. The charge control circuit according to claim 1, further comprising:
a voltage detection unit that detects a terminal voltage of the lead storage battery, wherein
the charge control unit:
performs an n-stage (wherein n is an integer of 2 or more) constant current charge of starting a constant current charge with a predetermined charging current value, and proceeding to charge of a subsequent stage with the charging current value decreased when the terminal voltage of the lead storage battery detected by the voltage detection unit reaches a predetermined end-of-charge voltage;
performs, in a charge of a final n-th stage, charging irrespective of the terminal voltage of the lead storage battery with a reduced value of or a same value as the charging current value of a previous stage, while clocking an elapsed time from a charge start of the n-th stage;
obtains a charged electric quantity used for charging the lead storage battery up to an (n−1)-th stage, based on the charging current value of each of the stages and a time required for the terminal voltage of the lead storage battery to reach the end-of-charge voltage in each of the stages; and
decides a charging time in a charge of the final n-th stage based on the charge electric quantity obtained by the computing unit and the obtained charged electric quantity, and ends the charge of the n-th stage when the decided charging time elapses.

8. A battery-operated device, comprising:
the charge control circuit according to claim 1;
the lead storage battery to be used as the power source;
a first load to which a current, of which a current value is less than the predetermined level, is supplied from the lead storage battery; and
a second load to which a current, of which a current value is not less than the predetermined level, is supplied from the lead storage battery.

9. The battery-operated device according to claim 8, further comprising:
a power source switch that turns ON/OFF a power supply from the lead storage battery to the second load; and
a device control unit that clocks an OFF time, in which the power source switch is turned OFF, from an end time of a previous charge.

10. The battery-operated device according to claim 8, further comprising:
a power source switch that turns ON/OFF a power supply from the lead storage battery to the first load and the second load; and
a device control unit that clocks an OFF time, in which the power source switch is turned OFF, from an end time of a previous charge, wherein
the second load includes a motor as a drive source, and
the device control unit further clocks a time, in which the power source switch is turned ON and the motor is not driven, from an end time of a previous charge.

11. A charging apparatus, comprising:
the charge control circuit according to claim 1; and
a charging unit that is controlled by the charge control circuit and charges the lead storage battery.

12. A method of charging a lead storage battery used as a power source of a battery-operated device, comprising:
a first step of acquiring, according to an instruction of charge start, a total discharge electric quantity of the lead storage battery during a period from an end time of a previous charge to a start time of a present charge, the total discharge electric quantity being separated into a first discharge electric quantity which is a discharge electric quantity of a discharge current having a current value of less than a predetermined level, and a second discharge electric quantity which is a discharge electric quantity of a discharge current having a current value of not less than the predetermined level;
a second step of obtaining a first charge electric quantity corresponding to the first discharge electric quantity acquired in the first step, a second charge electric quantity corresponding to the second discharge electric quantity acquired in the first step, and a charge electric quantity required for charging the lead storage battery as a sum of the obtained first charge electric quantity and second charge electric quantity; and
a third step of controlling a charge of the lead storage battery based on the charge electric quantity obtained in the second step.

* * * * *